United States Patent [19]

Tanioku et al.

[11] Patent Number: 4,758,617

[45] Date of Patent: Jul. 19, 1988

[54] PROCESS FOR PREPARING WATER-ABSORBING RESIN

[75] Inventors: Shozo Tanioku, Nara; Nobuyuki Oshima; Jun-ichi Maeno, both of Osaka; Kiyoshi Sato, Sakai, all of Japan

[73] Assignee: Arakawa Kagaku Kogyo Kabushiki Kaisha, Osaka, Japan

[21] Appl. No.: 874,929

[22] Filed: Jun. 16, 1986

[30] Foreign Application Priority Data

Jun. 21, 1985 [JP] Japan ................................ 60-136349

[51] Int. Cl.$^4$ ...................... C08G 81/02; C08K 3/00; C08L 33/00; C08L 51/02

[52] U.S. Cl. ................................ 524/413; 524/430; 524/437; 524/517; 524/547; 525/373; 525/374; 525/387

[58] Field of Search ............... 524/220, 430, 547, 437, 524/413, 517; 525/373, 374, 387

[56] References Cited

U.S. PATENT DOCUMENTS

| | | | |
|---|---|---|---|
| 4,552,938 | 11/1985 | Mikita et al. | 524/812 |
| 4,587,308 | 5/1986 | Makita et al. | 525/374 |
| 4,647,617 | 3/1987 | Saotome | 524/832 |

*Primary Examiner*—Herbert J. Lilling
*Attorney, Agent, or Firm*—Armstrong, Nikaido, Marmelstein & Marmelstein

[57] ABSTRACT

This invention provides a process for preparing a water-absorbing resin which comprises the steps of mixing powder of an inorganic inactive substance with a water-absorbing resin having carboxylate-containing monomer units, and adding water and a high molecular-weight cross-linking agent to the mixture to perform cross-linking reaction and evaporation of water, the cross-linking agent being selected from a specified copolymer (1) and a specified mixture of copolymers (2), and also provides a water-absorbing resin prepared by the process.

The process of the invention gives water-absorbing resins improved not only in water-absorbing ability, rate of water absorption, gel strength after water absorption and unlikelihood of affording a wetty feeling after water absorption but also in capability of retaining water under pressure.

10 Claims, No Drawings

PROCESS FOR PREPARING WATER-ABSORBING RESIN

This invention relates to a process for preparing a water-absorbing resin, and more particularly to a process for preparing a water-absorbing resin having improved properties including an outstanding capability of retaining water under pressure and enhanced safety.

Water-absorbing resins have found use in sanitary goods such as sanitary napkins, diapers and disposable dusters, agricultural or horticultural water retaining agents, sludge coagulants, condensation preventing agents for building materials, materials for removing water from oils, etc.

This type of known water-absorbing resins include cross-linked carboxymethyl cellulose, partially cross-linked polyoxyethylene, hydrolysis products of starch-acrylonitrile graft copolymers, starch-acrylic acid graft copolymers, partially cross-linked acrylate or methacrylate polymers, partially cross-linked acrylate or methacrylate copolymers, vinyl alcohol-acrylate copolymers, etc. However, these conventional water-absorbing resins have the drawbacks such as low water-absorbing ability, low gel strength after absorption of water despite high water-absorbing ability, the gel remaining damp after absorption of water, low rate of water absorption and the like.

It is known to elevate the rate of water absorption of a water-absorbing resin by increasing the cross-linking density of the resin. However, this method has the serious drawback of reducing the inherent water-absorbing ability of the resin with the increase of the cross-linking density of the resin.

The rate of water absorption can be also raised by a method comprising the steps of mixing a water-absorbing resin with water in the presence of a primary lower alcohol or like hydrophilic organic solvent to obtain a solution or dispersion, cross-linking the resin having the water substantially homogeneously absorbed therein and drying the resin. While cross-linking of the resin having the water absorbed therein is thought to be preferable in view of the properties of the water-absorbing resin, the method uses a limited amount of water and even a small amount of water used tends to result in agglomeration of resin particles swollen with water. Thus the method is inadequate to industrially carry out. Further, the method requires the mixing of the resin with a small amount of water in the presence of a large amount of a hydrophilic organic solvent to perform cross-linking reaction in a manner causing no agglomeration of resin particles, hence low in productivity. Moreover, cross-linking agents useful in the foregoing method include known low molecular-weight cross-linking agents such as ethylene glycol diglycidyl ether and the like which are likely to involve the hazard of irritating the human skin, consequently posing a hygienic problem when remaining in the contemplated resin. In addition, the lower molecular-weight cross-linking agent used in the method for improving the properties of a water-absorbing resin by cross-linking is readily absorbed into the interior of the resin during the cross-linking reaction, failing to selectively improve the surface of resin particles, and thus resulting in resin products with a water-absorbing ability having yet to be improved.

An object of this invention is to provide a novel water-absorbing resin free from the drawbacks of conventional methods and a process for preparing the same.

Another object of the invention is to provide a water-absorbing resin improved in properties such as water-absorbing ability, rate of water absorption, gel strength after water absorption and unlikelihood of giving a damp feeling after water absorption (ability to afford and maintain a dry feeling) and a process for preparing the same.

A further object of the invention is to provide a water-absorbing resin being improved not only in the foregoing properties but also in capability of retaining water under pressure and safety and a process for preparing the same.

A still further object of the invention is to provide a process for preparing the foregoing improved water-absorbing resin with ease and with enhanced efficiency at reduced costs.

These objects and other features of the invention will become more apparent from the following description.

In the course of extensive research which we conducted to achieve these objects, we found that when adding powder of an inorganic inactive substance to a starting water-absorbing resin in the foregoing conventional method for improving the properties of water-absorbing resin, the method can substantially fulfill the above objects without using the conventionally indispensable hydrophilic organic solvent. We applied for a patent of the method in Japan (Patent Application No. 19064/1984).

Our further research revealed that when using a specific high molecular-weight cross-linking agent to be described later in the method thus proposed in the Japanese patent application, the surface of starting water-absorbing resin particles can be selectively improved to result in the formation of a water-absorbing resin having higher capability of retaining water under pressure and enhanced safety as well as the outstanding properties of resins prepared by the proposed method. This invention has been accomplished based on this novel finding.

This invention provides a process for preparing a water-absorbing resin which comprises the steps of mixing powder of an inorganic inactive substance with a water-absorbing resin having carboxylate-containing monomer units, and adding water and a cross-linking agent to the mixture to perform cross-linking reaction and evaporation of the water, the cross-linking agent being at least one species selected from: (1) a copolymer comprising about 3 to about 40 mole % of glycidyl acrylate or glycidyl methacrylate (hereinafter referred to as "component A"), about 3 to about 50 mole % of dialkylaminoalkyl acrylate or dialkylaminoalkyl methacrylate and/or dialkylaminoalkyl acrylamide or dialkylaminoalkyl methacrylamide (hereinafter referred to as "component B"), about 20 to about 90 mole % of an unsaturated hydrophilic monomer copolymerizable with the components A and B and not containing any carboxyl group (hereinafter referred to as "component C"), and 0 to about 60 mole % of an unsaturated hydrophobic monomer copolymerizable with the components A, B and C (hereinafter referred to as "component D"), and (2) a mixture of a copolymer comprising about 3 to about 40 mole % of the component A, about 10 to about 97 mole % of the component C and 0 to about 50 mole % of the component D with a copolymer comprising about 3 to about 50 mole % of the component B, about 10 to about 97 mole % of the component C and 0 to about 50 mole % of the component D.

The term "carboxylate" used herein and in the appended claims encompasses both a carboxyl group and salts thereof (carboxylate).

The water-absorbing resin useful as the starting material in this invention can be any of the resins having carboxylate-containing monomer units consituting the polymer or copolymer. The water-absorbing resins useful as the starting material include those which are classified into:

(i) cross-linked acrylic acid or methacrylic acid polymers or copolymers, cross-linked polysaccharide-acrylic acid or methacrylic acid graft copolymers, cross-linked acrylic acid- or methacrylic acid-acrylamide-sulfonated acrylamide terpolymers, alkali metal salts or alkaline earth metal salts of these resins and the like, examples being cross-linked acrylic acid or acrylate polymers, cross-linked acrylic acid- or acrylate-methacrylic acid or methacrylate copolymers, cross-linked starch-acrylic acid or acrylate graft copolymers, etc.;

(ii) cross-linked saponification products of polysaccharide-alkyl acrylate or methacrylate graft copolymers, cross-linked saponification products of polysaccharide-acrylonitrile graft copolymers, cross-linked saponification products of polysaccharide-acrylamide copolymers and the like, examples being cross-linked saponification products of starch-ethyl acrylate gratf copolymers, cross linked saponification products of starch-methyl methacrylate graft copolymers, cross-linked saponification products of starch-acrylonitrile graft copolymers, cross-linked saponification products of starch-acrylamide graft copolymers, etc.;

(iii) cross-linked saponification products of alkyl acrylate or methacrylate-vinyl acetate copolymers, cross-linked saponification products of ethyl methacrylate-vinyl acetate copolymers, cross-linked saponification products of methyl acrylate-vinyl acetate copolymers and the like;

(iv) cross-linked saponification products of starch-acrylonitrile-acrylamide-2-methylpropane sulfonate graft copolymers and the like;

(v) cross-linked saponification products of starch-acrylonitrile-vinyl sulfonate graft copolymers and the like; and (vi) cross-linked sodium carboxymethyl cellulose and the like.

The cross-linked products exemplified above include those partially cross-linked.

The water-absorbing resins useful as the starting material in this invention are not limited, of course, to the examples described above. The water-absorbing resins enumerated above are usable singly or at least two of them can be used in mixture.

Of the above examples of starting water-absorbing resins, preferable are cross-linked acrylic acid or methacrylic acid polymers or copolymers, cross-linked polysaccharide-acrylic acid or methacrylic acid graft copolymers, cross-linked acrylic acid- or methacrylic acid-acrylamide-sulfonated acrylamide terpolymers, alkali metal salts thereof, alkaline earth metal salts thereof and the like.

The starting water-absorbing resin is used preferably in powdery or granular form according to this invention. Although the shape and the size (particle size) of useful resins are not specifically limited, preferred resins are those having a particle size of about 10 to about 600 mesh.

The powder of an inorganic inactive substance mixed with the starting water-absorbing resin in this invention acts as a dispersing medium to facilitate the contact of the water-absorbing resin with the cross-linking agent during the reaction of the resin with the cross-linking agent and water. In other words, the powder is needed to homogenize the reaction system or to make easy the reaction of the system being stirred. Typical examples of such powdery substances are powders of hydrous or anhydrous inorganic inactive substances such as silicon dioxide, aluminum oxide, titanium oxide and the like, and powders containing these substances as the chief ingredient. The powders of the substances are usable singly, or at least two of them can be used in mixture. Specific examples of suitable powders predominantly containing the hydrous or anhydrous inorganic inactive substances are those predominantly containing hydrous or anhydrous silicon dioxide (hereinafter referred to as "fine silica") such as colloidal silica, white carbon, ultrafine silica and the like, and those predominantly containing hydrous or anhydrous aluminum oxide such as plate-like hydrated alumina, fibrous hydrated alumina and the like. Of the above examples of powders of inorganic inactive substances, fine silica, hydrous or anhydrous titanium oxide powders, hydrous or anhydrous aluminum oxide powders are preferred.

The crystals of compounds constituting the inorganic inactive substance powders are not specifically limited; for example, any of $\alpha$-type, $\beta$-type and $\gamma$-type of aluminum oxide can be used with the same result. Any of TiO, $Ti_2O_3$ and $TiO_2$ can be used as titanium oxide. The amount of water present in the inorganic inactive substance powder is not specifically limited. For example, any of $Al_2O_3 \cdot H_2O$, $Al_2O_3 \cdot 2H_2O$ and $Al_2O_3 \cdot 3H_2O$ powders is advantageously used as aluminum oxide powders, and any of $TiO_2 \cdot H_2O$ and $TiO_2 \cdot 2H_2O$ powders, as titanium oxide powders.

Preferred mean particle size of inorganic inactive substance powders useful in this invention is in the range of about 0.001 to about 10 $\mu$m. The use of such inorganic inactive substance powder in the invention achieves improvements in the dispersibility of resin particles swollen with water and in the fluidity of resin particles.

The amount of useful inorganic inactive substance powder is usually about 0.1 to about 30 parts by weight per 100 parts by weight of the starting water-absorbing resin. The substance powder present in the foregoing range of amount produces a sufficient degree of the results as contemplated in the invention. However, far below about 0.1 part by weight of the powder, there occurs agglomeration of water-swollen resin particles even if the semi-swollen starting resin is stirred, and the agglomerates produced tend to inhibit smooth progress of the cross-linking reaction. Above about 30 parts by weight, further improved result is not achieved, and the water-absorbing ability with respect to the weight of the resin is apt to decrease.

It is critical in the invention to use a specified cross-linking agent. The cross-linking agent to be used in this invention is selected from the copolymers specified above in (1) (one-part type), and the mixture of copolymers specified above in (2) (two-part type). These cross-linking agents have the feature of containing at least two functional groups reactive with the carboxylate, hydroxyl, sulfone, amino or like groups present in the starting water-absorbing resin.

The component A constituting any of the copolymers described above in (1) and (2) is an unsaturated monomer containing epoxy group and is easily available in industries. Exemplary of dialkylaminoalkyl acrylate or methacrylate, i.e. one of the materials stated above for the component B, are dimethylaminomethyl acrylate, dimethylaminoethyl acrylate, dimethylaminopropyl acrylate, diethylaminomethyl acrylate, diethylaminoethyl acrylate, diethylaminopropyl acrylate and like acrylates, and the corresponding methacrylates, i.e. dimethylaminomethyl methacrylate, dimethylaminoethyl methacrylate, dimethylaminopropyl methacrylate, diethylaminomethyl methacrylate, diethylaminoethyl methacrylate, diethylaminopropyl methacrylate and the like. Representative of dialkylaminoalkyl acrylamide or methacrylamide, i.e. the other material for the component B, are dimethylaminomethyl acrylamide, dimethylaminoethyl acrylamide, dimethylaminopropyl acrylamide, diethylaminomethyl acrylamide, diethylaminoethyl acrylamide, diethylaminopropyl acrylamide and like acrylamides, and the corresponding methacrylamides, i.e. dimethylaminomethyl methacrylamide, dimethylaminoethyl methacrylamide, dimethylaminopropyl methacrylamide, diethylaminomethyl methacrylamide, diethylaminoethyl methacrylamide, diethylaminopropyl methacrylamide and like methacrylamides. These materials are usable singly or at least two of them can be used in mixture.

The component C is an unsaturated hydrophilic monomer copolymerizable with the components A and B and is selected from among compounds unreactive with the dialkylamino group of the component B. Illustrative of the compounds are vinyl acetate, vinyl pyrrolidone, 2-hydroxyethyl acrylate or methacrylate and like hydroxyl-group-containing monomers, acrylamide, methacrylamide, polyethylene glycol monoacrylate or monomethacrylate, alkali metal salt of vinylsulfonic acid, etc. Among them polyethylene glycol monoacrylate or monomethacrylate is suitable, a typical example being a product commercially available under a tradename "Blemmer-PE" manufactured by NIPPON OILS & FATS CO., LTD., Japan.

The component D is selected from unsaturated hydrophobic monomers copolymerizable with the components A, B and C. Specific examples of such monomers are methyl acrylate, ethyl acrylate, butyl acrylate, 2-ethylhexyl acrylate, methyl methacrylate, ethyl methacrylate, butyl methacrylate, 2-ethylhexyl methacrylate, acrylonitrile, polypropylene glycol monoacrylate or monomethacrylate and the like. Of these monomers, preferable is polypropylene glycol monoacrylate or monomethacrylate such as a product commercially available under a tradename "Blemmer-PP" manufactured by NIPPON OILS & FATS CO., LTD., Japan. The component D is not critically but optionally used as the component of the cross-linking agent useful in this invention. The addition of the component D can adjust the degree of hydrophilic property of the resulting high molecular-weight cross-linking agent.

The copolymer specified above in (1) comprises about 3 to about 40 mole % of the component A, about 3 to about 50 mole % of the component B, about 20 to about 90 mole % of the component C and 0 to about 60 mole % of the component D. The use of the copolymer (1) results in a cross-linking agent serving to give a water-absorbing resin having the improved properties according to this invention.

The mixture of copolymers specified above in (2) consists of the copolymer comprising the specific amounts of the components A, C and D (hereinafter called "component A-containing copolymer") and the other copolymer comprising the specific amounts of the components B, C and D (hereinafter called "component B-containing copolymer"). The component A-containing copolymer comprises about 3 to about 40 mole % of the component A, about 10 to about 97 mole % of the component C and 0 to about 50 mole % of the component D. The component B-containing copolymer comprises about 3 to about 50 mole % of the component B, about 10 to about 97 mole % of the component C and 0 to about 50 mole % of the component D. The proportions of the component A-containing copolymer and component B-containing copolymer to be mixed are suitably determined depending on the amounts by mole of the components A and B present in the copolymers. Preferred proportions thereof are an substantially equimolecular amounts of the components A and B, to which the amounts thereof, however, are not limited. For example, the ratio by mole of the component A to component B ranges from about 8:2 to about 2:8, preferably from about 6:4 to about 4:6. The mixture of copolymers (2) can achieve the same degree of results as those obtained by the copolymer (1). According to this invention, the copolymer (1) and the mixture of copolymers (2) can be conjointly used in such proportions that the combined amount of the components used is in the same range as described above.

The desired copolymes can be prepared from the foregoing components by various conventional methods such as solution polymerization method, suspension polymerization method and the like. Polymerization initiators commonly used in the art are usable in these methods. Useful polymerization initiators include water-soluble azo initiators such as 2,2-azobis-(2-amidinopropane) dihydrochloride.

Of said polymerization methods, the solution polymerization method is preferred. The solution polymerization method is carried out, for example, by heating a suitable organic solvent such as methanol, ethanol, isopropyl alcohol, methylisobutylketone, etc. and adding dropwise thereto the specified amounts of the monomers (e.g. components A to D) and a polymerization initiator to cause the monomers to undergo polymerization reaction, or by dissolving the monomers and the polymerization initiator in the solvent and heating the solution to perform polymerization reaction, or by adequately combining these steps. In any of the procedure courses, it is desired that the amount of the polymerization initiator be in the range of about 0.001 to about 5.0% by weight, preferably about 0.01 to about 1.0% by weight, based on the total weight of the monomers.

The amount of the high molecular-weight cross-linking agent to be used is suitably determined depending on the kind of the cross-linking agent and kind of the starting water-absorbing resin to be used. The properties stated hereinbefore of the water-absorbing resin prepared are affected by the amount of the cross-linking agent used. The amount of any of the cross-linking agents (1) and (2) is about 0.1 to about 10 parts by weight, preferably about 0.5 to about 5 parts by weight, per 100 parts by weight of the starting water-absorbing resin, calculated as the solids. If less than about 0.1 part by weight of the agent is present, the water-absorbing resin prepared are not given the improved properties as desired. Over about 10 parts by weight of the agent can not improve the properties of the resin to a further extent, only entailing economical disadvantage.

According to this invention, water is added, together with the cross-linking agent, to the mixture of starting water-absorbing resin and powder of inorganic inactive substance. The water, which greatly affects the properties of the water-absorbing resin prepared, is used in an amount of about 5 to about 100% by weight, preferably about 10 to about 65% by weight, based on the solids of starting water-absorbing resin. The presence of water leads to production of the desired water-absorbing resin improved in the properties including water-absorbing ability, rate of water absorption, gel strength, dry feeling and the like. Less than about 5% by weight of water fails to give a satisfactory degree of gel strength and favorable dry feeling to the resin, whereas more than about 100% by weight of water agglomerates the semi-swollen starting resin particles despite the presence of inorganic inactive substance powder, eventually making it difficult to perform uniform cross-linking reaction or impeding the progress of the reaction. The incorporation of water gives the advantage that only the presence of the inorganic inactive substance powder assures the desired homogeneity of the cross-linking reaction system without use of a large amount of a hydrophilic organic solvent as in conventional reaction processes, consequently permitting the reaction with vigorous stirring to smoothly proceed. Accordingly the process of this invention gives a water-absorbing resin with significantly higher volumetric efficiency (amount of water-absorbing resin produced per batch) than conventional processes, and also eliminates the need of procedures for collecting and recovering the organic solvent used. In consequence, the process of the invention is also advantageous in producing the contemplated water-absorbing resin at reduced costs.

The process of the invention is performed by mixing the specified amounts of the starting water-absorbing resin and the inorganic inactive substance powder and adding water and the cross-linking agent to the mixture to cause cross-linking reaction and evaporation of the water. Preferably the addition of water and cross-linking agent is effected while adequately stirring the mixture. The water and cross-linking agent can be separately added to the mixture. Also the procedure can be done by preparing an aqueous solution of the cross-linking agent and adding the aqueous solution of cross-linking agent to the mixture. The method of addition is not specifically limited and can be variously conducted insofar as it brings the water and cross-linking agent into substantially uniform contact with the starting water-absorbing resin to make cross-linking reaction. Addition methods suitable to industrially carry out are, for example, a showering method and spraying method. The addition and subsequent agitation procedures can be any of those which can bring about substantial homogeneity of the reacting components. For example, available methods include those using a stirrer having stirring blades of varying shapes, pneumatic stirrer, kneader, a pipeline mixer or the like.

After the addition of water and cross-linking agent, the cross-linking reaction favorably proceeds by raising the temperature of the reaction system to a suitable level. The evaporation of water can be done under atmospheric pressure or reduced pressure.

The temperature of cross-linking reaction can be suitably varied depending on the kind of cross-linking agent to be used, kind and amount of inorganic inactive substance powder to be used, the properties required of desired water-absorbing resin, the utility of the resin and the like. Preferred temperature is usually in the range of about 40° to about 150° C.

In this way, the process of the invention gives a water-absorbing resin improved in properties including water-absorbing ability, rate of water absorption, strength of gel and the like, free from the phenomenon of resin particles remaining as undissolved lumps after absorption of water and having various other features such as an ability to give a dry feeling after absorption of water. Further, the water-absorbing resin thus prepared has the advantages of being able to retain the water to a marked degree on applying pressure on the gel after absorption of water and of posing no hygienic problem such as irritation of the human skin. Moreover, the water-absorbing resin of the invention can overcome the problem heretofore unresolved on deterioration of work environment, for example, the risks of resin particles being dusted by spreading the particles over pulp sheets in producing paper diaper sheets.

It remains to be clarified how the water-absorbing resin having such outstanding characteristics can be prepared by the process of the invention. The cause of preparation is presumed to be as follows. Since the above-specified high molecular-weight cross-linking agent to be used in the invention is cationic, there occurs ionic bond between the cross-linking agent and the carboxylate in the starting water-absorbing resin to result in local presence of the cross-linking agent in the vicinity of the surface of water-absorbing resin particles while the component B (tertiary amine) contained in the cross-linking agent serves as a catalyst so that reaction readily proceeds between the carboxylate in the water-absorbing resin and the epoxy group in the cross-linking agent, thereby causing selective cross-linking in the vicinity of the surface of resin particles.

The water-absorbing resin of the invention can be used for the same purposes as those of conventional water-absorbing resins and is particularly useful as a material for sanitary articles.

This invention will be described below in more detail with reference to Reference Examples illustrating the preparation of high molecular-weight cross-linking agents to be used in the present invention and Examples illustrating the process of the invention to which, however, the invention is limited in no way.

REFERENCE EXAMPLE 1

Into a 1-liter flask equipped with a stirrer, reflux condenser, thermometer and inlet tube for nitrogen were placed 350 g of isopropyl alcohol (hereinafter referred to "IPA"), 321.5 g of polyethylene glycol monomethacrylate (tradename "Blemmer PE-350," product of NIPPON OILS & FATS CO., LTD., Japan), 12.5 g of diethylaminoethyl methacrylate, 12.5 g of glycidyl methacrylate and 0.35 g of 2,2-azobis-(2-amidinopropane) dihydrochloride (tradename "V-50," product of WAKO PURE CHEMICAL INDUSTRIES, LTD., Japan). The system was heated in an atmosphere of nitrogen to a temperature of 80° C. Then the system was stirred at the same temperature for 3 hours to complete the reaction, giving a solution of the resin in solids concentration of 50% which is hereinafter called "high molecular-weight cross-linking agent A".

REFERENCE EXAMPLE 2 TO 4

The reaction procedure of Reference Example 1 was repeated with the exception of varying the kind and amount of at least one of the monomers used in Reference Example 1 as shown below in Table 1, affording a solution of the resin in solids concentration of 50%. Three kinds of solutions thus prepared are hereinafter called "high molecular-weight cross-linking agents B to D," respectively.

TABLE 1

| Reference Example | Component A | Component B | Component C | Component D | ratio by mole of A:B:C:D |
|---|---|---|---|---|---|
| 1 | GMA (12.5 g) | DE (16.0 g) | Blemmer PE-350 (321.5 g) | None | 10:10:80:0 |
| 2 | GMA (13.5 g) | DE (18.0 g) | Blemmer PE-350 (177.0 g) | Blemmer PP-1000 (141.5 g) | 10:10:40:40 |
| 3 | None | DE (32.0 g) | Blemmer PE-350 (318.0 g) | None | 0:20:80:0 |
| 4 | GMA (25.0 g) | None | Blemmer PE-350 (325.0 g) | None | 20:0:80:0 |

The abbreviations and tradenames used in Table 1 are as follows:
GMA; Glycidyl methacrylate
DE; Diethylaminoethyl methacrylate
Blemmer PP-1000; Polypropylene glycol monoacrylate (product of NIPPON OILS & FATS CO., LTD., Japan)
Blemmer PE-350; Polyethylene glycol monomethacrylate (product of NIPPON OILS & FATS CO., LTD., Japan)

EXAMPLE 1

Into a 300-ml separable flask were placed 100 g of powder of cross-linked potassium polyacrylate (tradename "ARASORB," product of Arakawa Kagaku Kogyo Kabushiki Kaisha, Japan) and 3 g of fine silica (0.012 μm in mean particle size, tradename "AEROSIL 200," product of NIPPON AEROSIL CO., LTD., Japan). The mixture was fully stirred by a stirrer. Thereto was gradually added with stirring a solution of 2 g of the high molecular-weight cross-linking agent A prepared in Reference Example 1 (IPA solution in solids concentration of 50%) in 10 g of water to obtain a uniform dispersion. The dispersion was heated and maintained at about 120° C. for about 1 hour while distilling off the water. The remaining water was evaporated off under a reduced pressure of about 30 mmHg for 10 minutes, giving 105 g of a water-absorbing resin sample according to this invention.

The properties of the water-absorbing resin sample thus obtained were determined by the following methods.

1. Water-absorbing ability

Into a 200-ml beaker were placed 150 g of deionized water and 0.12 g of the water-absorbing resin sample. The mixture was left to stand for 30 minutes and filtered through a 200-mesh metal gauze. The weight of the water thus separated was measured. The water-absorbing ability of the resin sample was given by the following equation:

$$\text{Water-absorbing ability} = \frac{\left(\begin{array}{c}\text{Weight of water}\\\text{initially present}\end{array}\right) - \left(\begin{array}{c}\text{Weight of water}\\\text{separated}\end{array}\right)}{\text{Weight of water-absorbing resin sample}}$$

2. Ability to absorb a physiological saline solution

The ability of the sample to absorb a physiological saline solution was determined by carrying out the same procedure as above in 1 with the exception of using a physiological saline solution (0.9% aqueous solution of sodium chloride) in place of the deionized water used therein.

3. Rate of water absorption

Into a 100-ml beaker were introduced 50 g of a physiological saline solution (0.9% aqueous solution of sodium chloride) and a stirring rod. The solution was stirred at 600 r.p.m. with a magnetic stirrer. Into the solution was poured 2 g of the water-absorbing resin sample to cause gellation by swelling action after absorption of water. The gellation subdued the fluidity of the sample, reducing the swirl generated by stirring to disappearance. The rate of water absorption was expressed in terms of the time taken from the addition of water-absorbing resin sample until the disappearance of the swirl.

4. Gel strength

A physiological saline solution (60 g) and 2.0 g of the water-absorbing resin sample were mixed together to form a gel (hereinafter referred to as "30-fold gel"). The hardness (surface hardness) of the gel was measured by Neo curdmeter (tradename, product of IIO ELECTRIC CO., LTD., Japan). The surface hardness of the gel is expressed in terms of the resistance of the gel to the force with which the pressure-sensitive axle is forced forward against the gel in the surface of the sample.

5. Consistency of gel

The stickiness of the gel was evaluated from the consistency of the 30-fold gel measured with use of Neo curdmeter. The consistency of the gel refers to the specific viscosity which is commensurate with the friction force of the gel against the flow thereof. 6. Capability of retaining water under pressure Into an aluminum dish (5.5 cm in diameter, 1 cm in depth) were placed 0.5 g of the water-absorbing resin sample and 15 g of a physiological saline solution, and the mixture was left to stand for 2 minutes. Eleven sheets of filter paper having a diameter of 5.5 cm were dipped into the mixture and subjected to pressure under a load of 1 kg for 10 minutes. The weight (gram) of the ten sheets thus pressed (namely, after removal of the lowermost sheet in direct contact with the sample) was measured to calculate the weight thus increased, thereby evaluating the capability of retaining water under pressure.

Table 2 below shows the properties of the water-absorbing resin sample determined by the methods described above.

EXAMPLE 2

The procedure of Example 1 was repeated with the exception of using 2 g of the high molecular-weight cross-linking agent B obtained in Reference Example 2 (IPA solution in solids concentration of 50%) in place of the high molecular-weight cross-linking agent A prepared in Reference Example 1.

Table 2 blow shows the properties of the resulting water-absorbing resin sample determined in the same manner as in Example 1.

EXAMPLE 3

The procedure of Example 1 was repeated with the exception of using 2 g of the high molecular-weight cross-linking agent C obtained in Reference Example 3 (IPA solution in solids concentration of 50%) and 2 g of the high molecular-weight cross-linking agent D obtained in Reference Example 4 (IPA solution in solids concentration of 50%) in place of the high molecular-weight cross-linking agent A prepared in Reference Example 1.

Table 2 blow shows the properties of the resulting water-absorbing resin sample determined in the same manner as in Example 1.

EXAMPLE 4

A water-absorbing resin according to this invention was prepared by following the procedure of Example 1 and using the high molecular-weight cross-linking agent A obtained in Reference Example 1 but in an amount of 6 g.

Table 2 below shows the properties of the resulting water-absorbing resin sample determined in the same manner as in Example 1.

EXAMPLE 5

A water-absorbing resin according to this invention was prepared by following the procedure of Example 1 with the exception of using 6 g of the high molecular-weight cross-linking agent B obtained in Reference Example 2 (IPA solution in solids concentration of 50%) in place of 2 g of the high molecular-weight cross-linking agent A obtained in Reference Example 1.

Table 2 below shows the properties of the resulting water-absorbing resin determined in the same manner as in Example 1.

TABLE 2

| Ex. | Water-absorbing ability (g/g) Deionized water | Water-absorbing ability (g/g) Physiological saline | Rate of water absorption (sec) | Gel strength (dyne /cm$^2$) | Consistency (dyne · sec/cm$^2$) | Capability of retaining water under pressure (g) |
|---|---|---|---|---|---|---|
| 1 | 715 | 66 | 9 | 4.8 × 10$^3$ | 1.5 × 10$^4$ | 0.5 |
| 2 | 620 | 64 | 6 | 5.2 × 10$^3$ | 2.6 × 10$^4$ | 0.5 |
| 3 | 705 | 65 | 9 | 4.2 × 10$^3$ | 1.5 × 10$^4$ | 0.5 |
| 4 | 710 | 65 | 8 | 4.6 × 10$^3$ | 1.7 × 10$^4$ | 0.5 |
| 5 | 630 | 65 | 6 | 5.1 × 10$^3$ | 2.7 × 10$^4$ | 0.5 |

We claim:

1. A process for preparing a cross-linked or partially cross-linked water-absorbing resin which comprises the steps of mixing powder of an inorganic inactive substance with a water-absorbing resin being the polymerization product of carboxylate-containing monomer units, and adding water in an amount of about 5 to about 100% by weight based on the solid weight of the starting water-absorbing resin and a cross-linking agent in an amount of at least 0.1 part by weight per 100 parts by weight of the starting water-absorbing resin to the mixture to perform cross-linking reaction and evaporation of the water, the water-absorbing resin containing a functional group reactive with the cross-linking agent and the cross-linking agent containing at least two functional groups reactive with the functional group of the water-absorbing resin and being at least one species selected from:

(1) a copolymer comprising about 3 to about 40 mole % of glycidyl acrylate or glycidyl methacrylate (component A), about 3 to about 50 mole % of dialkylaminoalkyl acrylate or dialkylaminoalkyl methacrylate and/or dialkylaminoalkyl acrylamide or dialkylaminoalkyl methacrylamide (component B), about 20 to about 90 mole % of an unsaturated hydrophilic monomer copolymerizable with the components A and B and not containing any carboxyl group (component C), and 0 to about 60 mole % of an unsaturated hydrophilic monomer copolymerizable with the components A, B and C and (2) a mixture of a copolymer comprising about 3 to about 40 mole % of the component A, about 10 to about 97 mole % of the component C and 0 to about 50 mole % of the component D with a copolymer comprising about 3 to about 50 mole % of the component B, about 10 to about 97 mole % of the component C and 0 to about 50 mole % of the component D.

2. A process according to claim 1 wherein the copolymer (1) is used as the cross-linking agent.

3. A process according to claim 1 wherein the cross-linking agent is the mixture of copolymers (2) in a ratio by mole of the component A to component B of about 8:2 to about 2:8.

4. A process according to claim 1 wherein the cross-linking agent is a copolymer prepared by solution polymerization method.

5. A process according to claim 1 wherein the cross-linking agent is used in an amount, calculated as solids, of about 0.1 to about 10 parts by weight per 100 parts by weight of the starting water-absorbing resin.

6. A process according to claim 1 wherein the water is used in an amount of about 5 to about 100% by weight based on the solids of the starting water-absorbing resin.

7. A process according to claim 1 wherein the water is used in an amount of about 10 to about 65% by weight based on the solids of the starting water-absorbing resin.

8. A process according to claim 1 wherein the starting water-absorbing resin is one selected from the group consisting of cross-linked acrylic acid or methacrylic acid polymers or copolymers, cross-linked polysaccharide-acrylic acid or methacrylic acid graft copolymers, cross-linked acrylic acid- or methacrylic acid-acrylamide-sulfonated acrylamide terpolymers, alkali metal salts thereof and alkaline metal salts thereof.

9. A process according to claim 1 wherein the the powder of inorganic inactive substance is at least one of substance powders selected from the group consisting of fine silica, titanium oxide powder and alumina powder.

10. A process according to claim 1 wherein the inorganic inactive substance powder is used in an amount of about 0.1 to about 30 parts by weight per 100 parts by weight of solids of starting water-absorbing resin.

* * * * *